United States Patent
Chang

(10) Patent No.: US 10,436,636 B2
(45) Date of Patent: Oct. 8, 2019

(54) OPTICAL MEASURING DEVICE

(71) Applicant: CHROMA ATE INC., Tao-Yuan (TW)

(72) Inventor: Wei-Yao Chang, Tao-Yuan (TW)

(73) Assignee: CHROMA ATE INC., Tao-Yuan (TW)

( * ) Notice: Subject to any disclaimer, the term of this patent is extended or adjusted under 35 U.S.C. 154(b) by 0 days.

(21) Appl. No.: 16/158,319

(22) Filed: Oct. 12, 2018

(65) Prior Publication Data

US 2019/0113384 A1 Apr. 18, 2019

(30) Foreign Application Priority Data

Oct. 12, 2017 (TW) .............................. 106134963 A

(51) Int. Cl.
  *G01J 1/42* (2006.01)
  *G01J 1/04* (2006.01)
(52) U.S. Cl.
  CPC ........... *G01J 1/4257* (2013.01); *G01J 1/0411* (2013.01); *G01J 1/0414* (2013.01); *G01J 1/0422* (2013.01); *G01J 1/4228* (2013.01)
(58) Field of Classification Search
  CPC ...... G01J 1/4257; G01J 1/0422; G01J 3/2803; H04B 10/85; H04L 9/0858; G01N 21/031; G01N 21/05; G01N 21/6428; G01N 21/6456; G01N 21/85
  See application file for complete search history.

(56) References Cited

U.S. PATENT DOCUMENTS

| | | | | |
|---|---|---|---|---|
| 4,723,315 A | * | 2/1988 | Wetherell | H04B 10/61 398/203 |
| 5,365,535 A | * | 11/1994 | Yamaguchi | G11B 7/126 359/618 |
| 5,434,412 A | * | 7/1995 | Sodickson | A61B 5/14532 250/343 |
| 5,675,415 A | * | 10/1997 | Akatsu | G01D 5/268 356/364 |
| 6,141,138 A | * | 10/2000 | Machida | G01J 9/00 359/279 |

(Continued)

FOREIGN PATENT DOCUMENTS

| CN | 2890864 Y | 4/2007 |
|---|---|---|
| CN | 101782435 A | 7/2010 |

(Continued)

*Primary Examiner* — Sang H Nguyen
(74) *Attorney, Agent, or Firm* — CKC & Partners Co., LLC

(57) ABSTRACT

An optical measuring device is configured to measure a light beam emitted from a light source. The optical measuring device includes a light collecting element, at least four light-sensing elements, a light splitting device, and at least one lens. The light collecting element is configured to collect the light beam. The light-sensing elements are configured to respectively sense the light fields of different light paths of the light beam. The respective distances of the light paths between the respective light-sensing elements and the light source are different from each other. The light splitting device is configured to split the light beam passing through the light collecting element and respectively guide the split light beams to the light sensing elements. The lens is disposed between at least one of the light-sensing elements and the light collecting element, and is configured to form images on the at least four light-sensing elements.

9 Claims, 5 Drawing Sheets

(56) References Cited

U.S. PATENT DOCUMENTS

| | | | |
|---|---|---|---|
| 6,442,411 B1* | 8/2002 | Guthermann | A61B 5/14532 600/310 |
| 6,592,822 B1* | 7/2003 | Chandler | G01N 15/1456 356/72 |
| 9,557,856 B2 | 1/2017 | Send et al. | |
| 9,655,519 B2 | 5/2017 | Darty et al. | |
| 2002/0071121 A1* | 6/2002 | Ortyn | C07K 1/047 356/419 |
| 2005/0068536 A1* | 3/2005 | Schwabe | B01L 3/502715 356/436 |
| 2008/0085121 A1* | 4/2008 | Tomaru | H04B 10/85 398/138 |
| 2011/0200319 A1 | 8/2011 | Kravitz et al. | |
| 2014/0374622 A1* | 12/2014 | Cronin | G01J 1/0492 250/459.1 |
| 2015/0286340 A1* | 10/2015 | Send | G01S 17/46 345/175 |

FOREIGN PATENT DOCUMENTS

| | | |
|---|---|---|
| CN | 103148935 A | 6/2013 |
| EP | 2952861 A1 | 12/2015 |

* cited by examiner

OPTICAL MEASURING DEVICE

CROSS-REFERENCE TO RELATED APPLICATION

This application claims priority to Taiwan Application Serial Number 106134963, filed Oct. 12, 2017, which is herein incorporated by reference in its entirety.

BACKGROUND

Field of Invention

The present disclosure relates to an optical measuring device.

Description of Related Art

With the advancement of semiconductor technology, high-power and high-efficiency light sources, such as lasers, have been achieved. Lasers can even gradually replace incandescent bulbs or fluorescent tubes. Laser beams have good collimation, high power, and high light intensity, so lasers have wide application in modern industry. However, the optical properties of the laser, such as the size of the beam waist, the divergence angle, the numerical aperture, the beam quality factor and/or other characteristics, are usually needed to be learned before the laser is applied; accordingly, it is necessary to measure and analysis the characteristics of the laser by a measurement tool.

SUMMARY

The present disclosure provides an optical measuring device for measuring a light beam emitted from a light source. The optical measuring device includes a light collecting element, at least four light-sensing elements, a beam splitting device, and at least one lens. The light collecting element is configured to collect the light beam. The light-sensing elements are configured to respectively sense the light fields of the light beam. The respective distances of the light paths between the respective light-sensing elements and the light source are different from each other. The light splitting device is configured to split the light beam passing through the light collecting element and respectively guide the split light beams to the light sensing elements. The lens is disposed between at least one of the light-sensing elements and the light collecting element. The lens is configured to image the light beam passing through the light collecting element on the at least four light-sensing elements. The optical measuring device calculates the optical parameters of the light beam based on the measurement data of the light-sensing elements.

In the above-mentioned embodiment, the measurement error caused by time and vibration can be eliminated because the light fields of the different light paths are simultaneously measured by at least four light-sensing elements; therefore, the purposes of saving time and improving accuracy can be both achieved.

It is to be understood that both the foregoing general description and the following detailed description are by examples, and are intended to provide further explanation of the present disclosure.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
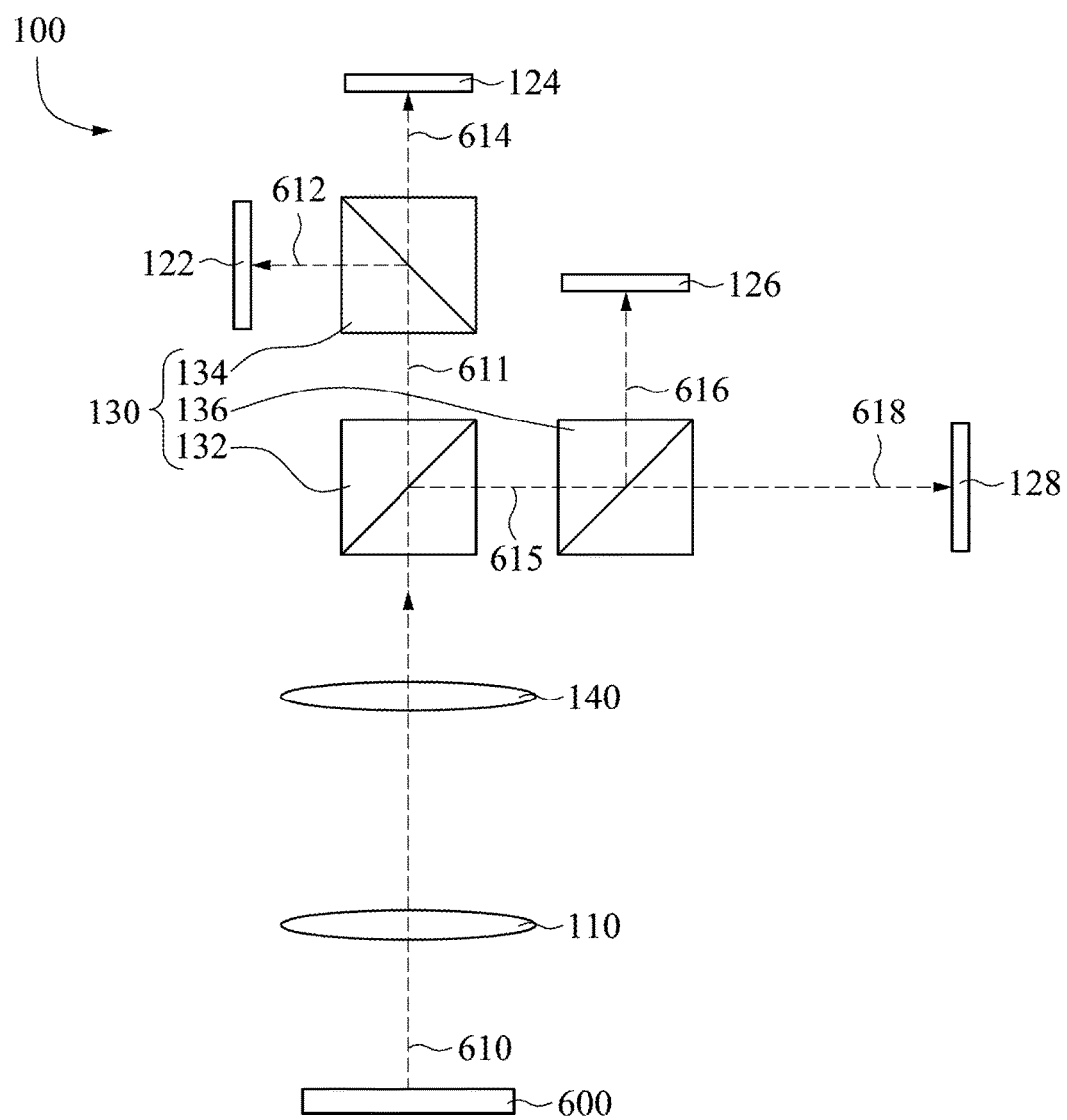
FIG. 1 is a schematic diagram of an optical measuring device and a light source according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The following discloses a plurality of embodiments by figures; for clarity, many practical details will be described in the following description. However, it should be understood that these practical details should not be limiting. In other words, in some embodiments of the present disclosure, these practical details are not necessary. In addition, in order to simplify the figures, some conventionally known structures and elements are schematically illustrated in the figures.

Figure 2:
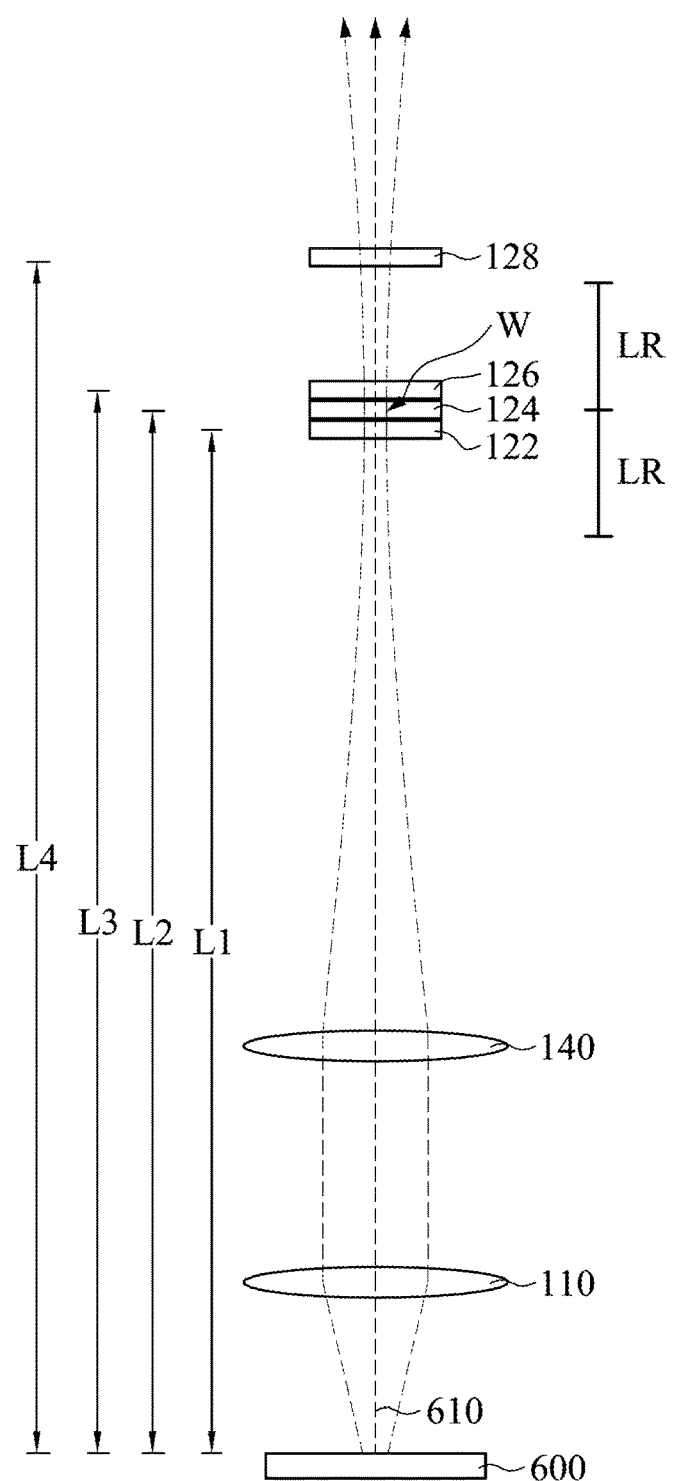
FIG. 2 is an equivalent light path diagram of the optical measuring device of FIG. 1.

FIG. 1 is a schematic diagram of the optical measuring device 100 and the light source 600 according to an embodiment of the present disclosure, and FIG. 2 is an equivalent light path diagram of the optical measuring device 100 and the light source 600 of FIG. 1. The optical measuring device 100 is configured to measure the light beam 610 emitted by the light source 600. The optical measuring device 100 includes a light collecting element 110, at least four light-sensing elements 122, 124, 126, and 128, a light splitting device 130, and at least one lens 140. The light collecting element 110 is configured to receive the light beam 610. The light-sensing element 122, 124, 126, and 128 are configured to respectively sense the light fields of the light beam 610. The respective distances of the light paths L1, L2, L3, and L4 between the respective light-sensing elements 122, 124, 126, and 128 and the light source 600 are different from each other. The light splitting device 130 is configured to split the light beam 610 passing through the light collecting element 110 and respectively guide the split light beams to the light sensing elements 122, 124, 126, and 128. The lens 140 is disposed between at least one of the light-sensing elements 122, 124, 126, and 128 and the light collecting element 110. For example, in FIG. 1, the lens 140 is disposed between the light collecting element 110 and the light splitting device 130. The lens 140 is configured to image the light beam 610 passing through the light collecting element 110 on at least one of the light-sensing elements 122, 124, 126, and 128. For example, in FIG. 1, the lens 140 respectively images the light beam 610 passing through the light collecting element 110 on the respective light-sensing elements 122, 124, 126, and 128. The optical measuring device 100 calculates the beam waist W and/or other optical parameters of the light beam 610 based on the measurement values measured by the light-sensing elements 122, 124, 126, and 128. In addition, although the optical measuring device 100 in FIG. 1 includes four light-sensing elements 122, 124, 126, and 128; in other embodiments, other light-sensing elements may be added according to the actual requirements; the foregoing description is to be considered merely as illustrative of the present disclosure and not in limitation thereof.

In short, at least four of the light-sensing elements 122, 124, 126, and 128 are simultaneously applied to the optical measuring device 100 of the present embodiment to get the light fields of the light beam 610 in different distances. The diameter and the position of the beam waist of the light beam 610, and other optical parameters of the light beam 610 (e.g. the divergence angle, the numerical aperture, the beam quality factor, $M^2$ factor and/or other parameters of the light beam 610) can be calculated according to the light fields measured by the light-sensing elements 122, 124, 126, and 128, so as to increase the accuracy in the optical parameter measurement and decrease the measurement time. Specifically, the optical parameters of the light beam 610 can be calculated according to the measured changes (which is measured by the light-sensing elements 122, 124, 126, and 128) in space of the light fields of the light beam 610. However, if the light fields in different distances of the light beam 610 are measured by only a single light-sensing element at different time points at different distances, it is time-consuming, and the light fields may vary with time; further, the movement of the light-sensing element may cause the vibration of the beam 610; these factors result in inaccuracy in the measurement results. Nevertheless, in the present embodiment, because at least four light-sensing elements 122, 124, 126, and 128 are simultaneously applied to measure the light fields in different distances, the measurement errors caused by time and vibration can be excluded; therefore, the purposes of saving time and increasing accuracy can be achieved.

In this embodiment, the light splitting device 130 includes a first light splitting element 132, a second light splitting element 134, and a third light splitting element 136. In addition, for convenience, the four light-sensing elements are named as a first light-sensing element 122, a second light-sensing element 124, a third light-sensing element 126, and a fourth light-sensing element 128 in the following. The first light splitting element 132 is configured to split the light beam 610 passing through the light collecting element 110 into a first sub-light beam 611 and a second sub-light beam 615. The second light splitting element 134 is configured to split the first sub-light beam 611 into a third sub-light beam 612 and a fourth sub-light beam 614, and respectively guide the third sub-light beam 612 and the fourth sub-light beam 614 to the first light-sensing element 122 and the second light-sensing element 124. The third light splitting element 136 is configured to split the second sub-light beam 615 into a fifth sub-light beam 616 and a sixth sub-light beam 618, and respectively guide the fifth sub-light beam 616 and the sixth sub-light beam 618 to the third light-sensing element 126 and the fourth light-sensing element 128. Further, the first sub-light beam 611, the second sub-light beam 615, the third sub-light beam 612, the fourth sub-light beam 614, the fifth sub-light beam 616, and the sixth sub-light beam 618 have substantially the same optical properties. For example, the first sub-light beam 611, the second sub-light beam 615, the third sub-light beam 612, the fourth sub-light beam 614, the fifth sub-light beam 616, and the sixth sub-light beam 618 have the same wavelength ranges, the same light filed distributions, etc., but the first sub-light beam 611, the second sub-light beam 615, the third sub-light beam 612, the fourth sub-light beam 614, the fifth sub-light beam 616, and the sixth sub-light beam 618 may have the same or different light intensities, which are determined by the light splitting device 130. It should be understood that "substantial" is used to modify any slightly changeable relationship, but such slightly changeable relationship does not change the nature of a matter.

In this embodiment, the second light splitting element 134 and the third light splitting element 136 are respectively located on different sides of the first light splitting element 132; specifically, the two adjacent sides of the first light splitting element 132. For example, in FIG. 1, the line connecting the second light splitting element 134 and the first light splitting element 132 and the line connecting the third light splitting element 136 and the first light splitting element 132 are at right angles. In addition, in this embodiment, the lens 140 is disposed between the first light splitting element 132 and the light collecting element 110; this means the light beam 610 first passes through the lens 140, then passes through the light splitting device 130.

Referring to FIG. 2. After the light beam 610 passes through the light collecting element 110 and the lens 140, the light fields of the light beam 610 in the traveling direction are determined. In detail, after the light beam 610 passes through the light collecting element 110, the light beam 610 first converges and then diverges, and the minimum area of the cross-section of the light beam is referred to as the beam waist W of the light beam 610 at the imaging side. For the convenience of explanation, without considering that the magnification of the light collecting element 110 varies with the imaging distance, the length from the beam waist W site of the imaging side to the site at which the area is twice of the area at the beam waist W site is called Rayleigh length LR of the imaging side; Rayleigh length of the imaging side is also referred to as Rayleigh distance of the imaging side or Rayleigh range of the imaging side. In this embodiment, the first light-sensing element 122, the second light-sensing element 124, and the third light-sensing element 126 are all disposed at within the range of Rayleigh length LR of the imaging side, so that the beam waist W of the beam 610 at the imaging side can be calculated based on the light fields measured by the first light-sensing element 122, the second light-sensing element 124, and the third light-sensing element 126. In addition, the fourth light-sensing element 128 is disposed outside the length range of Rayleigh length LR of the imaging side; therefore, the divergence angle, numerical aperture, beam quality factor of the light beam 610 and/or other optical parameters of the light beam 610 can be calculated based on the light fields measured by the fourth light-sensing element 128 combined with the light fields measured by the first light-sensing element 122, the second light-sensing element 124, and the third light-sensing element 126.

Please refer to FIG. 1. In this embodiment, the light source 600 may be a laser, so the optical measuring device 100 may be applied to measure the beam waist and other optical parameters of the laser. In some embodiments, the light collecting element 110 may be a lens and/or a collimating element. The collimating element collimates the light beam 610 into parallel light. Basically, as long as the light collecting element 110 can collect or converge the light beam 610, that is, such method or device are in the scope of the present disclosure. In some embodiments, the light splitting elements (the first light splitting element 132, the second light splitting element 134, and the third light splitting element 136 in this embodiment) of the light splitting device 130 may be cube beam splitters, spectroscopes, half through half reverse mirrors, or other suitable light splitting elements, and the first light splitting element 132, the second light splitting element 134, and the third light splitting element 136 may be the same or different kinds of light splitting elements. Further, the first light splitting element 132, the second light splitting element 134, and the third light splitting element 136 may be separated from each other (as shown in FIG. 1), may contact with each other, or two of the light splitting elements separated from each other, and two of the light splitting elements contact with each other; the foregoing description is to be considered merely as illustrative of the disclosure and not in limitation thereof. In addition, the light-sensing elements 122, 124, 126, and 128 may be charge-coupled devices (CCDs).

Figure 3:
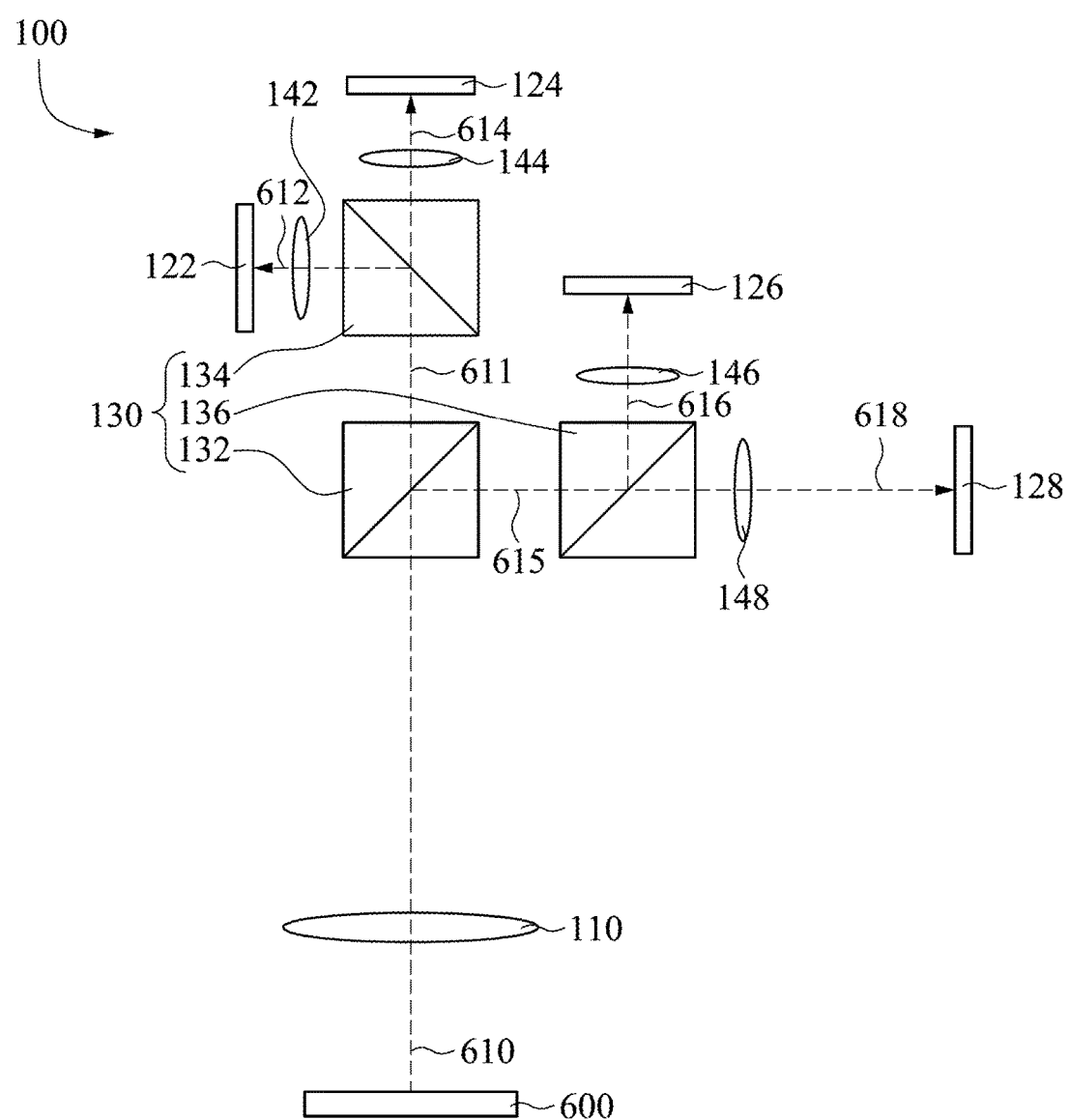
FIG. 3 is a schematic diagram of the optical measuring device and the source according to another embodiment of the present disclosure.
Figure 4:
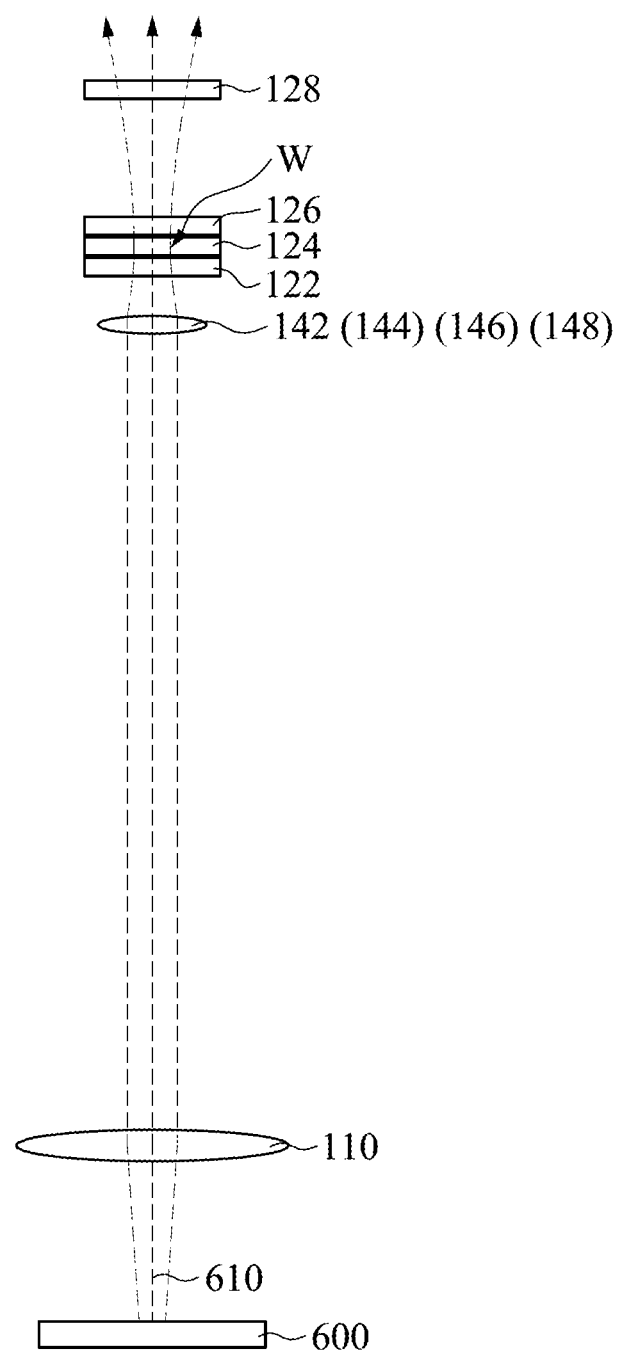
FIG. 4 is an equivalent light path diagram of the optical measuring device of FIG. 3.

FIG. 3 is a schematic diagram illustrating the optical measuring device 100 and the light source 600 according to another embodiment of the present disclosure, and FIG. 4 is an equivalent light path diagram of the optical measuring device 100 and the light source 600 of FIG. 3. The differences between FIG. 3 and FIG. 1 are the number and the position of the lenses. In FIG. 3, the number of lenses is plural, and they are lenses 142, 144, 146, and 148 respectively. The lenses 142, 144, 146, and 148 are respectively disposed between the light splitting device 130 and the respective light-sensing elements 122, 124, 126, and 128; this means that the light beam 610 first passes through the light splitting device 130, then respectively passes through the lenses 142, 144, 146, and 148. Specifically, the lens 142 is disposed between the second light splitting element 134 and the first light-sensing element 122, the lens 144 is disposed between the second light splitting element 134 and the second light-sensing element 124, the lens 146 is disposed between the third light splitting element 136 and the third light-sensing element 126, and the lens 148 is disposed between the second light splitting element 136 and the fourth light-sensing element 128. The lens 142 images the light beam 612 on the first light-sensing element 122, the lens 144 images the light beam 614 on the second light-sensing element 124, the lens 146 images the light beam 616 on the third light-sensing element 126, and the lens 148 images the light beam 618 on the fourth light-sensing element 128.

In this embodiment, the respective distances of the light paths between the respective lenses 142, 144, 146, and 148 and the light collecting element 110 are all the same. That is, in the equivalent light path diagram of FIG. 4, the lenses 142, 144, 146, and 148 are all disposed at the same site, so that the light beams 612, 614, 616, and 618 respectively passing through the lenses 142, 144, 146, and 148 have substantially the same spatial distributions of light fields. In addition, the distances between the lens 142 and the first light-sensing element 122, between the lens 144 and the second light-sensing element 124, between the lens 146 and the third light-sensing element 126, and between the lens 148 and the fourth light-sensing element 128, are all different from each other. For other details of the embodiment are the same as the details of the embodiment in FIG. 1 and FIG. 2, they are not described repeatedly.

Figure 5:
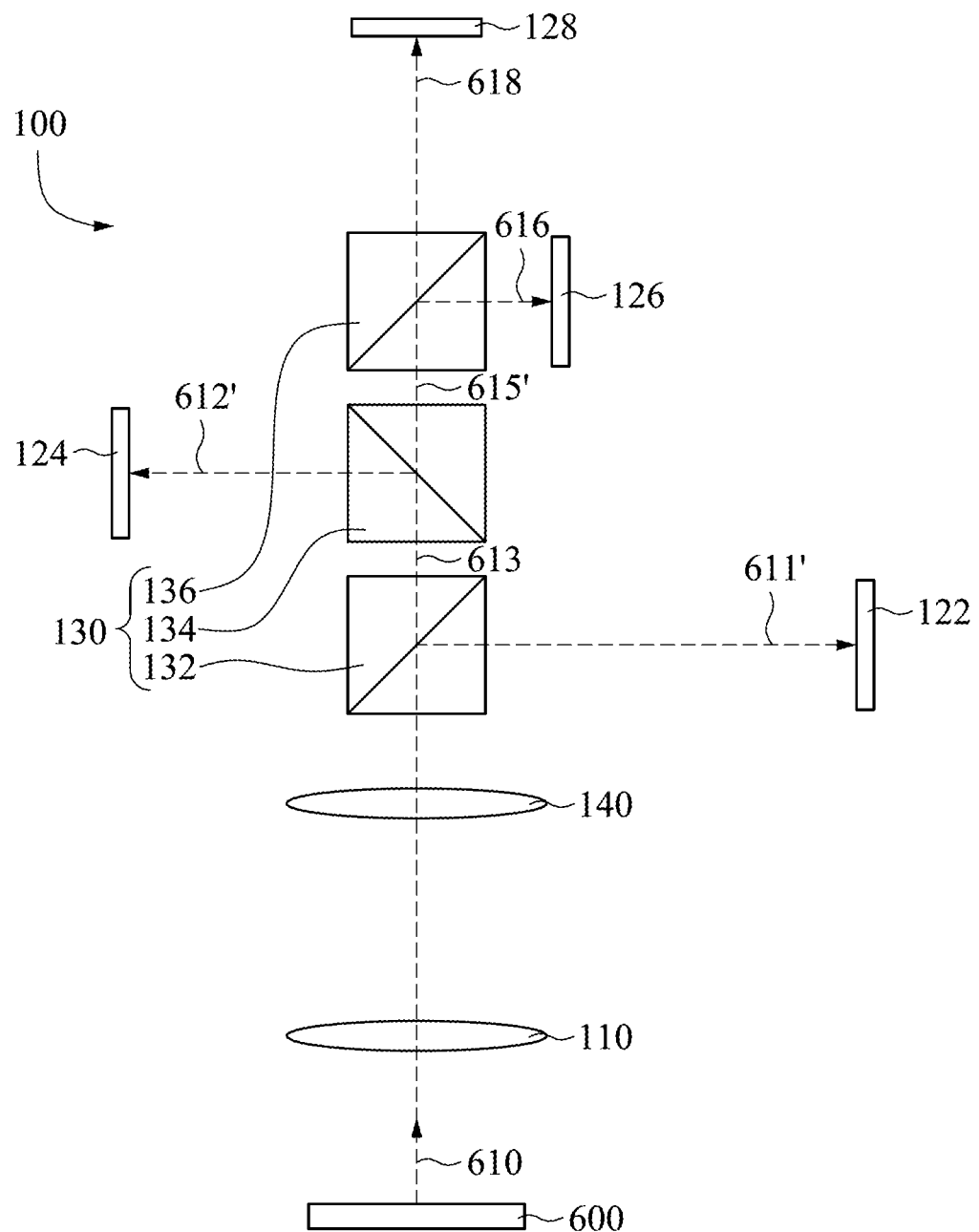
FIG. 5 is a schematic diagram of the optical measuring device and the light source according to yet another embodiment of the present disclosure.

FIG. 5 is a schematic diagram illustrating the optical measuring device 100 and the light source 600 according to a yet another embodiment of the present disclosure. The differences between FIG. 5 and FIG. 1 are the positions of the first light splitting element 132, the second light splitting element 134, and the third light splitting element 136 of the light splitting device 130. In FIG. 5, the first light splitting element 132, the second light splitting element 134, and the third light splitting element 136 are aligned in a straight line. The first light splitting element 132 is configured to split the light beam 610 passing through the light collecting element 110 into a first sub-light beam 611' and a second sub-light beam 613, and guide the first sub-light beam 611' to the first light-sensing element 122. The second light splitting element 134 is configured to split the second sub-light beam 613 into a third sub-light beam 612' and a fourth sub-light beam 615', and guide the third sub-light beam 612' to the second light-sensing element 124. The third light splitting element 136 is configured to split the fourth sub-light beam 615' into a fifth sub-light beam 616 and a sixth sub-light beam 618, and respectively guide the fifth sub-light beam 616 and the sixth sub-light beam 618 to the third light-sensing element 126 and the fourth light-sensing element 128. In addition, an equivalent light path diagram of the optical measuring device 100 and the source 600 of FIG. 5 is shown in FIG. 2. In addition, in some embodiments, there are also a plurality of lenses 140 in FIG. 5, the lenses are respectively disposed between the light splitting device 130 and the respective light-sensing elements 122, 124, 126, and 128. For other details of this embodiment are the same as the details of the embodiment in FIG. 1 and FIG. 2, they are not described repeatedly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical measuring device for measuring a light beam emitted from a light source, comprising:
   a light collecting element configured to collect the light beam;
   at least four light-sensing elements configured to respectfully sense light fields of different light paths of the light beam, wherein distances of the light paths between the light-sensing elements and the light source are different from each other, three of the light-sensing elements are disposed within Rayleigh length of an imaging side after the light beam passes through the light collecting element and the lens, and one of the light-sensing elements is disposed outside Rayleigh length of an imaging side after the light beam passes through the light collecting element and the lens;
   a light splitting device configured to split the light beam passing through the light collecting element into split light beams, and respectively guide the split light beams to the light-sensing elements; and
   at least one lens disposed between at least one of the light-sensing elements and the light collecting element, wherein the lens is configured to image the light beam passing through the light collecting element on the at least four light-sensing elements;
   wherein the optical measuring device calculates optical parameters of the light beam based on measurement data of the light-sensing elements.

2. The optical measuring device of claim 1, wherein the light-sensing elements comprise a first light-sensing element, a second light-sensing element, a third light-sensing element, and a fourth light-sensing element, and the light splitting device comprises:
   a first light splitting device configured to split the light beam passing through the light collecting element into a first sub-light beam and a second sub-light beam;

a second light splitting device configured to split the first sub-light beam into a third sub-light beam and a fourth sub-light beam, and respectively guide the third sub-light beam and the fourth sub-light beam to the first light-sensing element and the second light-sensing element; and a third light splitting device configured to split the second sub-light beam into a fifth sub-light beam and a sixth sub-light beam, and respectively guide the fifth sub-light beam and the sixth sub-light beam to the third light-sensing element and the fourth light-sensing element.

3. The optical measuring device of claim 2, wherein the second light splitting element and the third light splitting element are respectively located on different sides of the first light splitting element.

4. The optical measuring device of claim 1, wherein the at least four light-sensing elements comprises a first light-sensing element, a second light-sensing element, a third light-sensing element, and a fourth light-sensing element, and the light splitting device comprises:

a first light splitting element configured to split the light beam passing through the light collecting element into a first sub-light beam and a second sub-light beam, and guide the first sub-light beam to the first light-sensing element;

a second light splitting element configured to split the second sub-light beam into a third sub-light beam and a fourth sub-light beam, and guide the third sub-light beam to the second light-sensing element; and a third light splitting element configured to split the fourth sub-light beam into a fifth sub-light beam and a sixth sub-light beam, and respectively guide the fifth sub-light beam and the sixth sub-light beam to the third light-sensing element and the fourth light-sensing element.

5. The optical measuring device of claim 4, wherein the first light splitting element, the second light splitting element, and the third light splitting element are arranged along a straight line.

6. The optical measuring device of claim 1, wherein the lens is disposed between the light splitting device and the light collecting element.

7. The optical measuring device of claim 1, wherein a number of the lens is plural, and a plurality of lenses are respectively disposed between the light splitting device and the light-sensing elements.

8. The optical measuring device of claim 7, wherein distances of respective light paths between respective the lenses and the light collecting element are same.

9. The optical measuring device of claim 1, wherein the light collecting element is a collimating element collimating the light beam into parallel light.

* * * * *